(12) United States Patent
Vasant

(10) Patent No.: US 7,243,746 B1
(45) Date of Patent: Jul. 17, 2007

(54) RECREATIONAL ELECTRIC VEHICLE

(76) Inventor: Abraham Vasant, 1587 Bluebell Ct., Livermore, CA (US) 94551

( * ) Notice: Subject to any disclaimer, the term of this patent is extended or adjusted under 35 U.S.C. 154(b) by 0 days.

(21) Appl. No.: 10/714,113

(22) Filed: Nov. 14, 2003

Related U.S. Application Data

(63) Continuation-in-part of application No. 29/183,300, filed on Jun. 9, 2003, now abandoned.

(51) Int. Cl.
  *B62D 11/04* (2006.01)
(52) U.S. Cl. .......................... 180/6.5; 180/21
(58) Field of Classification Search ................ 180/6.2, 180/6.5, 21, 907, 908
  See application file for complete search history.

(56) References Cited

U.S. PATENT DOCUMENTS

| | | | |
|---|---|---|---|
| 880,823 A | 3/1908 | Redfield | |
| 991,485 A | 5/1911 | Darrow | |
| 1,426,975 A | 8/1922 | Fuscaldo | |
| 1,437,412 A | 12/1922 | Girling | |
| 2,076,722 A | * 4/1937 | Heinze | 180/21 |
| 2,111,983 A | 3/1938 | Massey | |
| 2,520,835 A | 8/1950 | England | |
| 2,533,752 A | 12/1950 | Alamagny | |
| 2,548,749 A | 4/1951 | Stout | |
| 2,592,893 A | 4/1952 | Hansen | |
| 2,641,480 A | 6/1953 | Bancroft | |
| 2,941,346 A | 6/1960 | Perry | |
| 3,154,162 A | * 10/1964 | McCaleb et al. | 180/6.66 |
| 3,166,141 A | 1/1965 | Shields et al. | |
| 3,177,962 A | 4/1965 | Bailey | |
| 3,245,493 A | * 4/1966 | Barrett, Jr. | 180/168 |
| 3,386,753 A | 6/1968 | Quedreux | |
| 3,656,572 A | 4/1972 | Mercier | |
| 3,700,059 A | 10/1972 | Sutton | |
| 3,712,397 A | 1/1973 | Smith, III et al. | |
| 3,820,790 A | 6/1974 | Peterson | |
| 4,037,678 A | 7/1977 | Braune | |
| 4,041,678 A | 8/1977 | Chaney et al. | |
| 4,063,611 A | 12/1977 | Anderson | |
| D246,849 S | 1/1978 | Hart | |
| 4,101,004 A | 7/1978 | Oltman | |
| 4,154,314 A | 5/1979 | Tsuji et al. | |
| 4,324,301 A | 4/1982 | Eyerly | |
| 4,340,124 A | * 7/1982 | Leonard | 180/208 |
| 4,484,646 A | * 11/1984 | Smith | 180/6.2 |
| 4,529,052 A | * 7/1985 | Imai et al. | 180/6.48 |
| 4,570,739 A | 2/1986 | Kramer | |
| D282,830 S | 3/1986 | Zafma et al. | |
| 4,630,701 A | 12/1986 | Venetjoki | |
| 4,650,238 A | 3/1987 | Healey | |

(Continued)

FOREIGN PATENT DOCUMENTS

DE 494280 10/1930

(Continued)

*Primary Examiner*—Kevin Hurley
(74) *Attorney, Agent, or Firm*—Kunzler & McKenzie

(57) ABSTRACT

The recreational electric vehicle (hereinafter REV) is a convenient indoor or outdoor vehicle for one or two people with a space for personal goods. REV is most suited for adaptations for recreational use. It uses electric power for zero pollutant emissions, quiet operation, and a very low running cost. REV is driven using a joystick and is able to turn on the spot.

20 Claims, 13 Drawing Sheets

Side View

U.S. PATENT DOCUMENTS

| | | | |
|---|---|---|---|
| 4,750,578 A | 6/1988 | Brandenfels | |
| 4,775,021 A | 10/1988 | Marino | |
| D298,521 S | 11/1988 | Ui et al. | |
| 4,892,166 A | 1/1990 | Gaffney | |
| 4,909,525 A | 3/1990 | Flowers | |
| 4,986,387 A | 1/1991 | Thompson et al. | |
| 4,989,351 A | 2/1991 | Shear | |
| 5,042,314 A * | 8/1991 | Rytter et al. | 74/335 |
| 5,058,016 A * | 10/1991 | Davidovitch | 701/22 |
| 5,086,870 A * | 2/1992 | Bolduc | 180/333 |
| 5,094,313 A | 3/1992 | Mauws | |
| 5,095,430 A * | 3/1992 | Bonito et al. | 700/92 |
| 5,150,762 A | 9/1992 | Stegeman et al. | |
| 5,181,740 A | 1/1993 | Horn | |
| 5,222,572 A | 6/1993 | Yamagiwa et al. | |
| D346,990 S | 5/1994 | Abbott et al. | |
| 5,333,702 A | 8/1994 | Gaffney et al. | |
| 5,445,233 A * | 8/1995 | Fernie et al. | 180/6.5 |
| 5,455,233 A * | 10/1995 | Spielvogel et al. | 514/44 |
| 5,484,030 A | 1/1996 | Glenn | |
| D371,526 S | 7/1996 | Verduyn et al. | |
| D373,099 S | 8/1996 | Molzon et al. | |
| D378,994 S | 4/1997 | Picard et al. | |
| 5,628,377 A | 5/1997 | Le Gloan | |
| 5,725,062 A | 3/1998 | Fronek | |
| 5,727,642 A | 3/1998 | Abbott | |
| 5,732,788 A | 3/1998 | Brown | |
| D393,511 S | 4/1998 | Albertsson | |
| 5,791,425 A | 8/1998 | Kamen et al. | |
| 5,904,218 A | 5/1999 | Watkins | |
| 5,923,096 A * | 7/1999 | Manak | 307/10.1 |
| 5,927,730 A | 7/1999 | Sattler | |
| 6,009,363 A * | 12/1999 | Beckert et al. | 701/33 |
| 6,050,367 A * | 4/2000 | Tvetene et al. | 187/234 |
| 6,062,023 A | 5/2000 | Kerwin et al. | |
| 6,071,063 A * | 6/2000 | McGrath et al. | 414/529 |
| 6,089,341 A | 7/2000 | Gingerich | |
| 6,095,267 A * | 8/2000 | Goodman | 180/6.5 |
| 6,104,154 A | 8/2000 | Harada et al. | |
| 6,170,592 B1 | 1/2001 | Wu | |
| D437,256 S | 2/2001 | Parent | |
| 6,199,932 B1 | 3/2001 | Welsh et al. | |
| D442,517 S | 5/2001 | Hoogenraad | |
| 6,313,394 B1 | 11/2001 | Shugar et al. | |
| D452,054 S | 12/2001 | Chan | |
| D452,189 S | 12/2001 | Doran | |
| D454,417 S | 3/2002 | Wu | |
| D454,996 S | 3/2002 | Lino | |
| D456,312 S | 4/2002 | Leutz | |
| 6,397,961 B1 | 6/2002 | Sutton | |
| 6,429,849 B1 * | 8/2002 | An et al. | 345/161 |
| 6,581,703 B2 | 6/2003 | Hammonds | |
| 2002/0014357 A1 | 2/2002 | Hammonds | |
| 2002/0166267 A1 * | 11/2002 | McGugan | 37/348 |

FOREIGN PATENT DOCUMENTS

| | | |
|---|---|---|
| FR | 573653 | 6/1924 |
| FR | 927521 | 10/1947 |
| FR | 1378894 | 10/1964 |
| GB | 818446 | 8/1959 |
| WO | PCT WO 00/75001 A1 | 12/2000 |

* cited by examiner

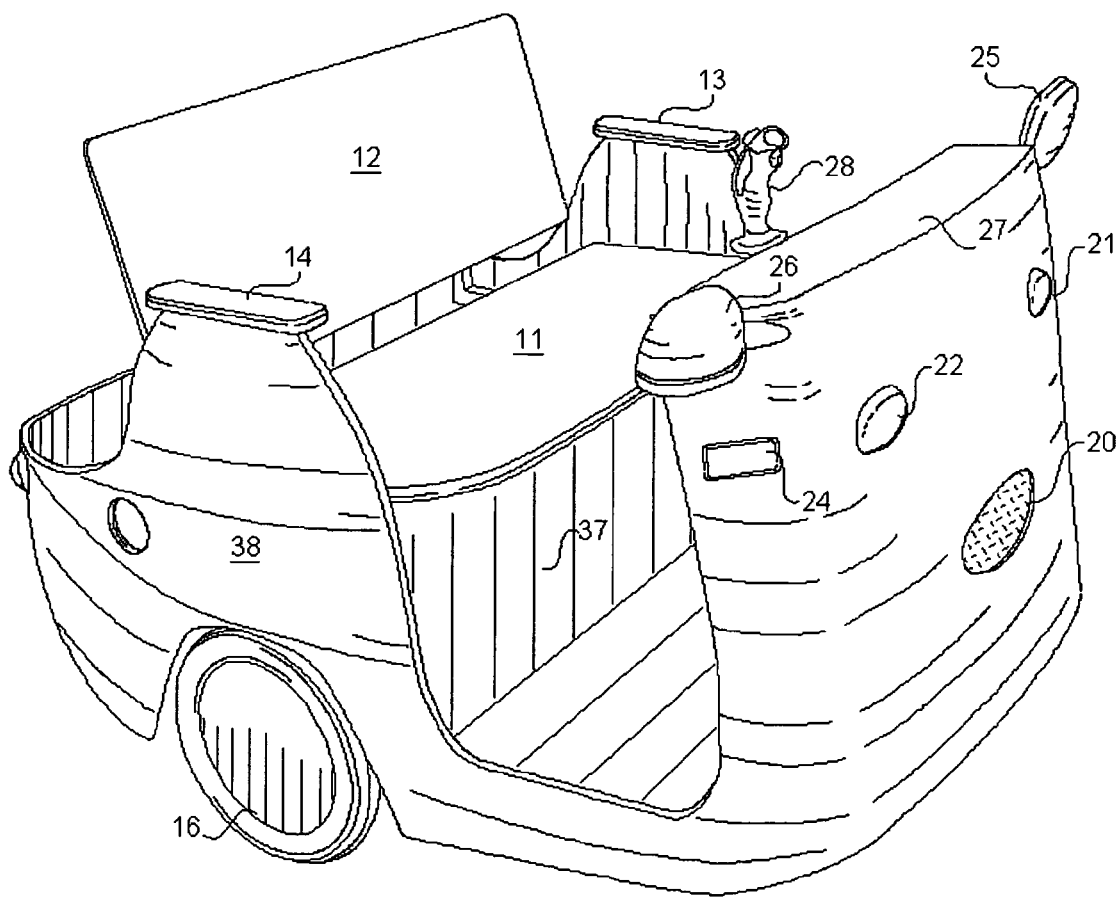
Figure :1  Perspective View

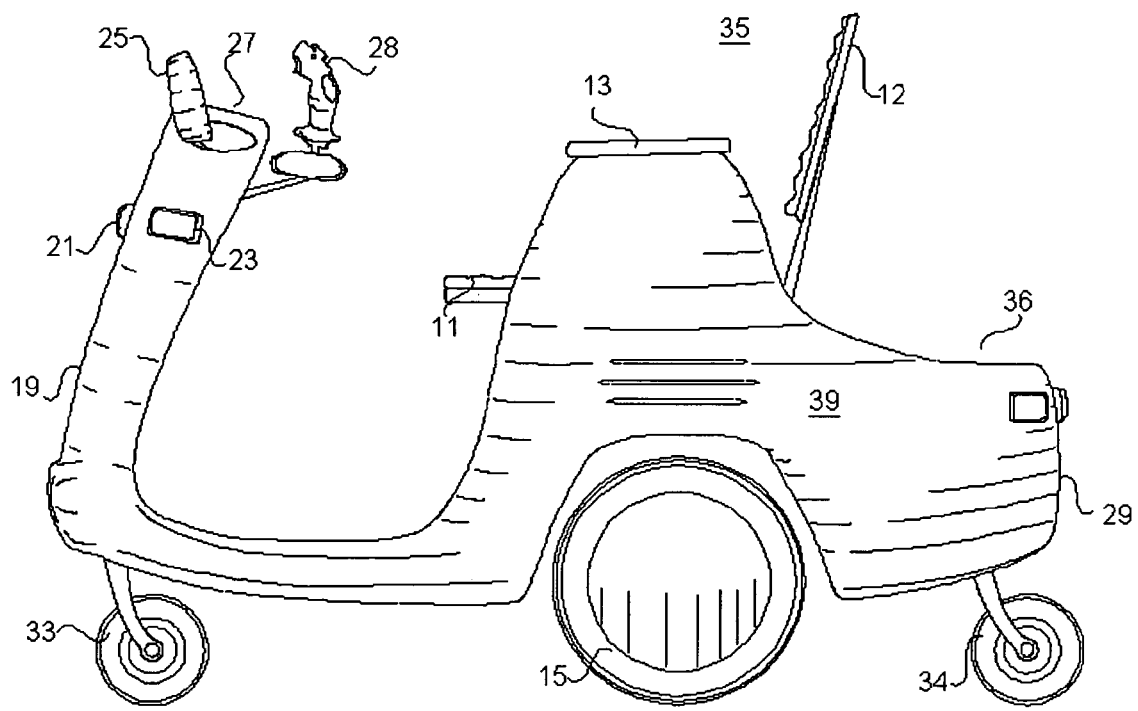
Figure 2: Side View

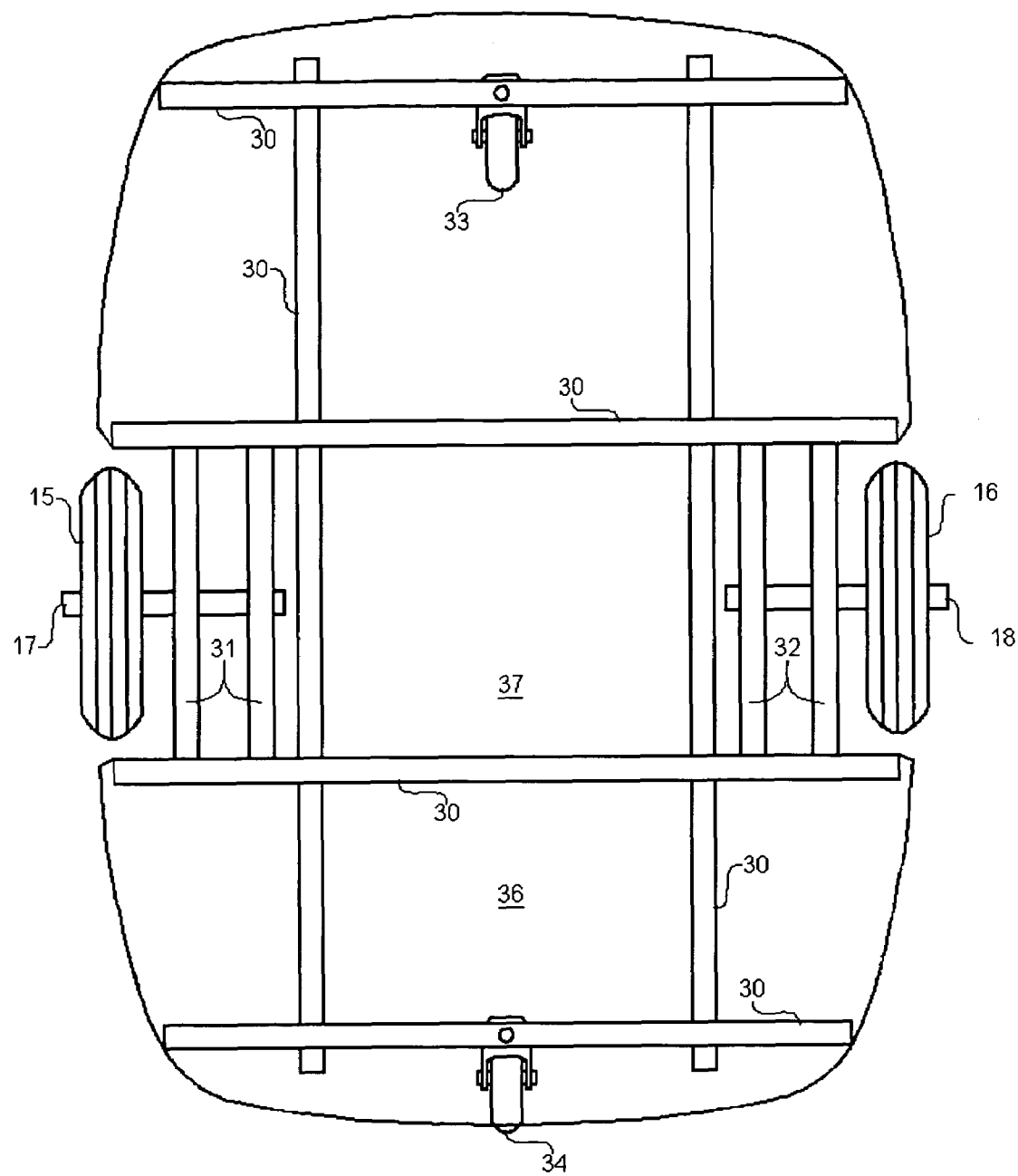
Figure 3 : Plan view of the chassis frame

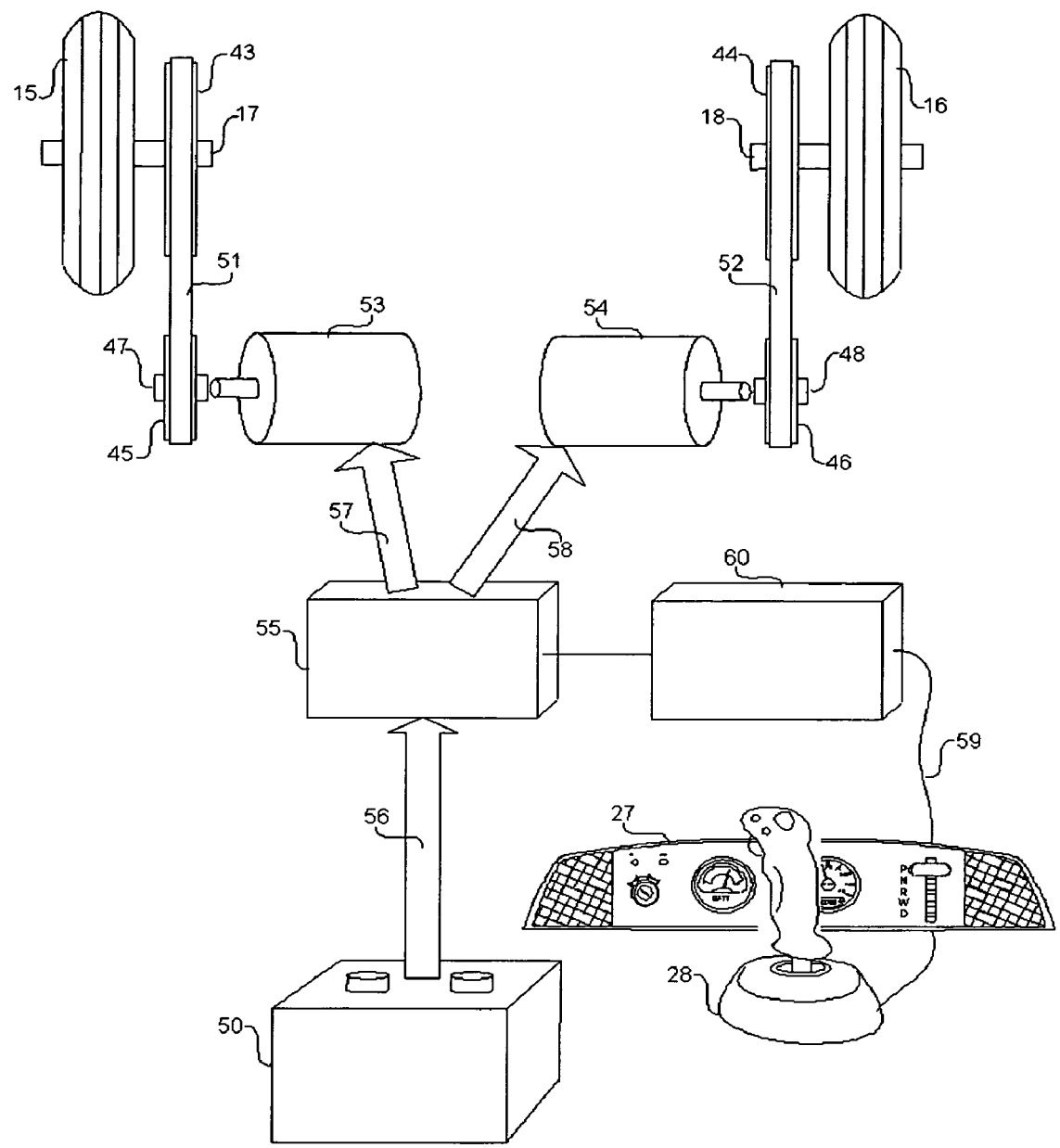
Figure 4: The drive system

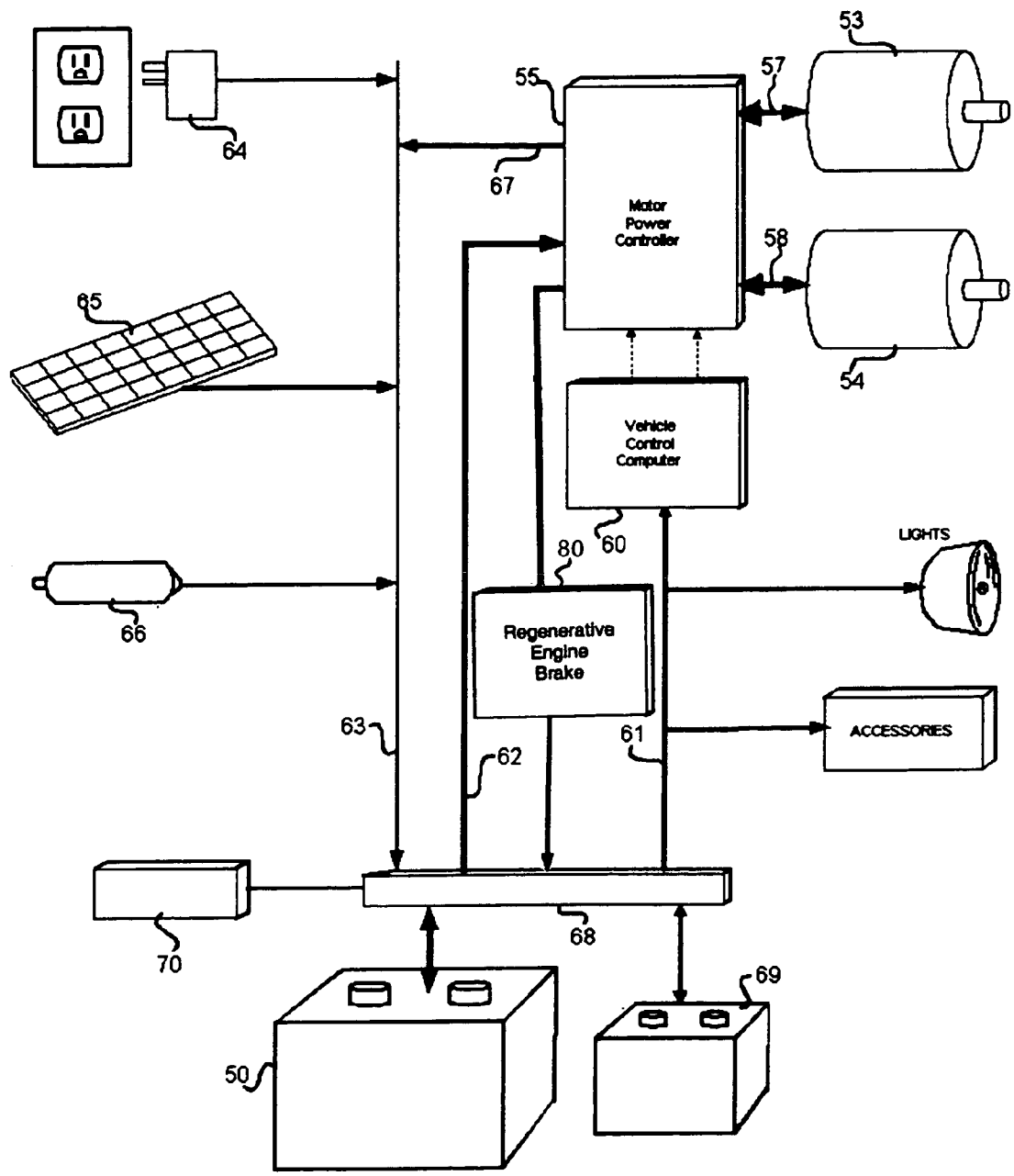
Figure 5 : Electrical System

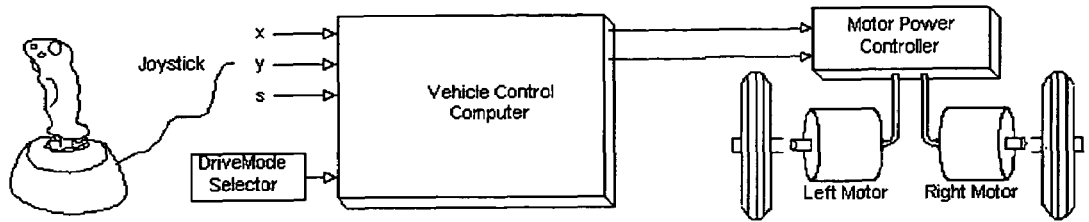

| Drive Mode | Joystick x | Joystick y | Joystick s | NOTES | L to R Ratio | Left Motor | Right Motor |
|---|---|---|---|---|---|---|---|
| Park | I | I | I | Wheels Locked | I | 0 | 0 |
| Neutral | I | I | I | Wheels unlocked | I | I | I |
| Drive Fwd | 0 | 0 | I | No Motion | - | 0 | 0 |
| | +X | 0 | I | Straightline Forward Motion | 1:1 | F | F |
| | +X | +y | I | Turn Right in Motion | 1:<1 | F | F |
| | +X | -Y | I | Turn Left in Motion | <1:1 | F | F |
| | -X | I | I | Brake applied, Stop | 1:1 | 0 | 0 |
| Reverse | 0 | 0 | I | No Motion | - | 0 | 0 |
| | -X | 0 | I | Straightline Reverse Motion | 1:1 | R | R |
| | -X | +y | I | Turn Right in Reverse | 1:<1 | R | R |
| | -X | -Y | I | Turn Left in Reverse | <1:1 | R | R |
| | +X | I | I | Brake applied, Stop | 1:1 | 0 | 0 |
| Weave: Fwd | 0 | 0 | I | No Motion | - | 0 | 0 |
| | +X | 0 | I | Straightline Forward Motion | 1:1 | F | F |
| | +X | +y | I | Turn Right in Forward | 1:<1 | F | F |
| | +X | -Y | I | Turn Left in Forward | <1:1 | F | F |
| | -X | 0 | I | Straightline Reverse | 1:1 | R | R |
| Rev | -X | +y | I | Turn Right in Reverse | 1:<1 | R | R |
| | -X | -Y | I | Turn Left in Reverse | <1:1 | R | R |
| Spin R | 0 | 0 | +S | Spin Right on the spot | 1:<1 | F | R |
| Spin L | 0 | 0 | -S | Spin Left on the spot | <1:1 | R | F |
| | 0 | 0 | 0 | If released, forced gentle stop | - | 0 | 0 |

Coments:
1. "I" denotes irrelevant, x, y, s are signed values from Joystick, "F" denotes Forward, "R" denotes Reverse
2. In Reverse Mode, handling speed is reduced for safety. In Weave Mode Speed is further reduced.
3. Weave:Spin can be also used in combination of Forward, Reverse motion Figure 6 : Joystick Motion control relations

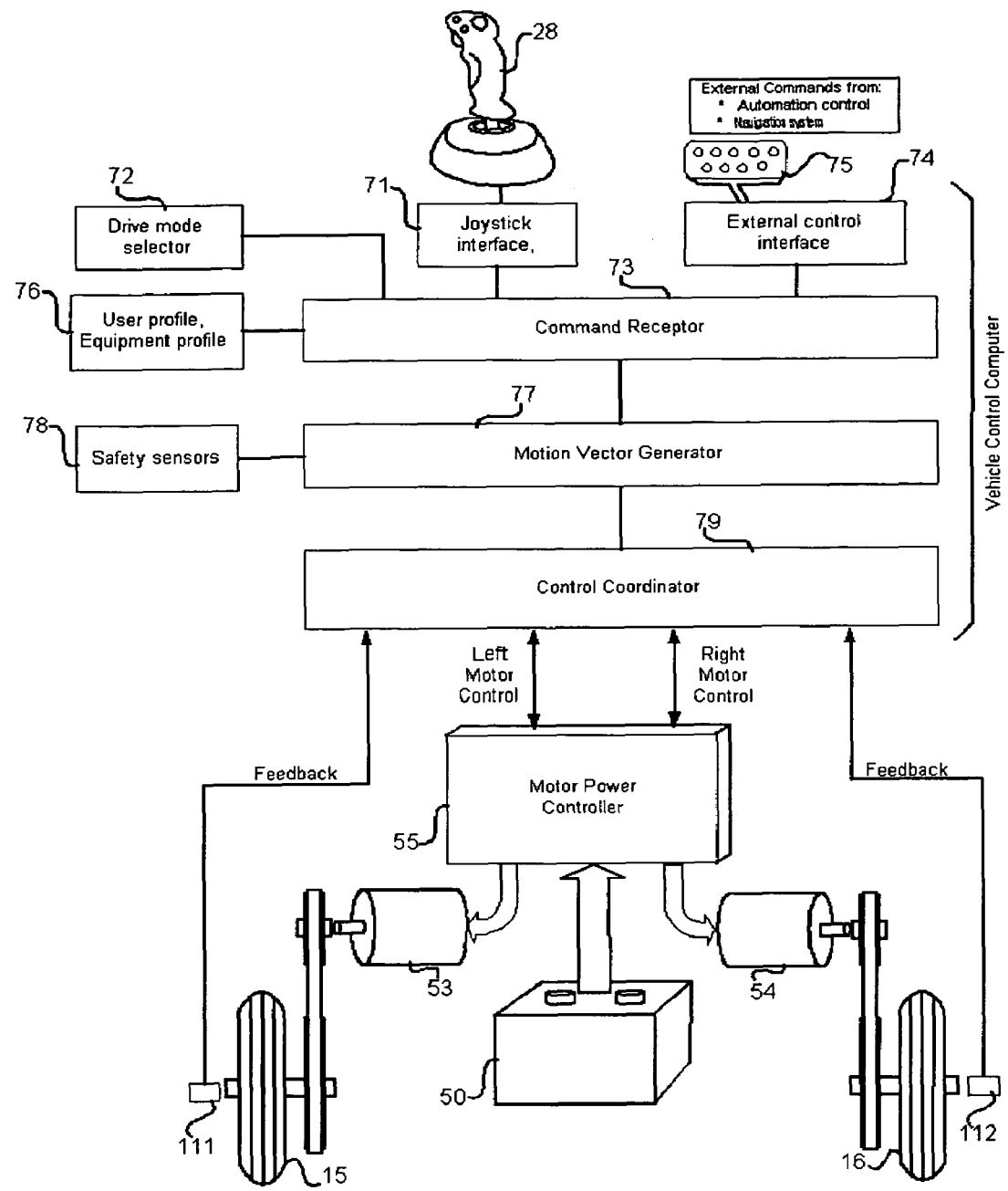
Figure 7 : Motion control block in operation

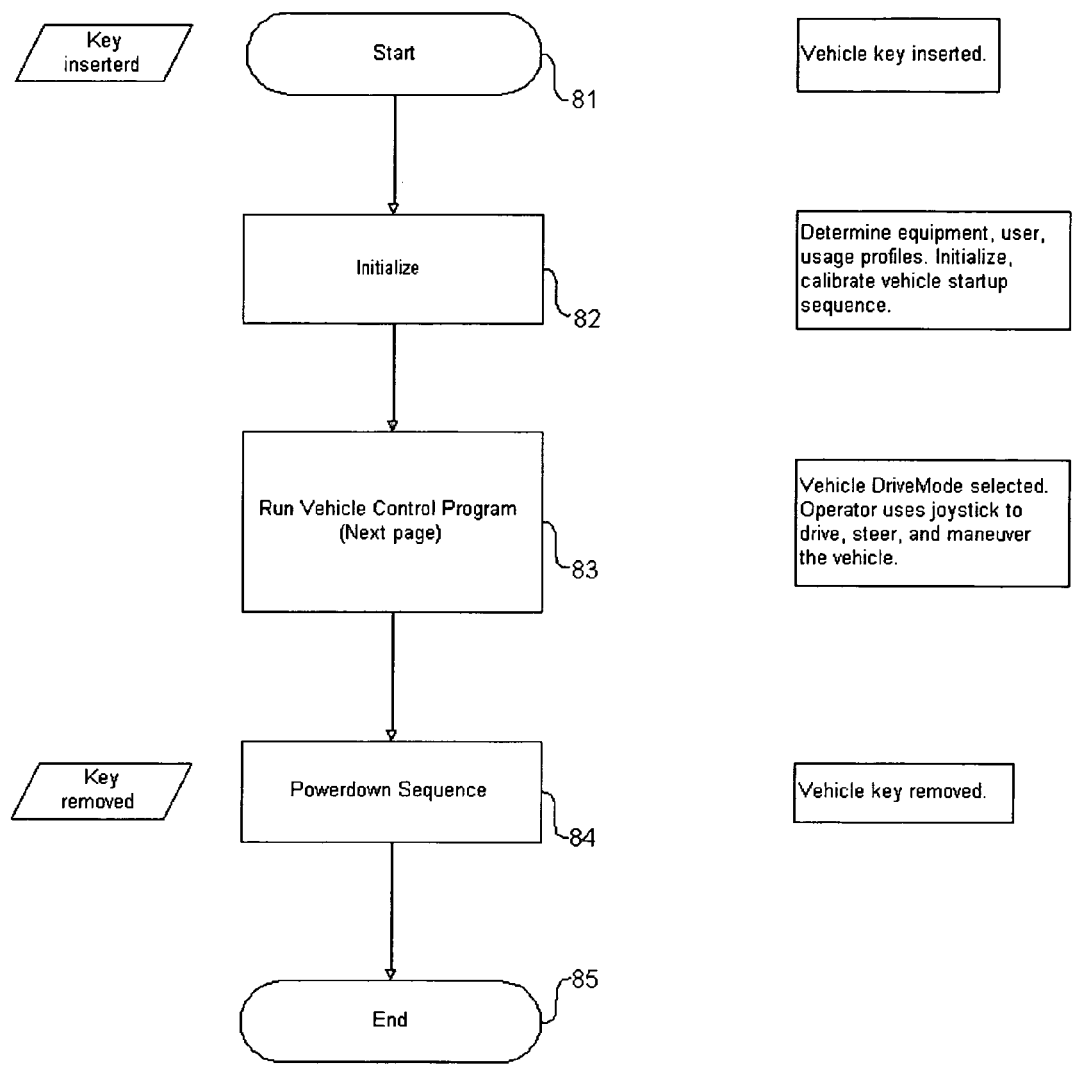
Figure 8 : Driver Operation Sequence

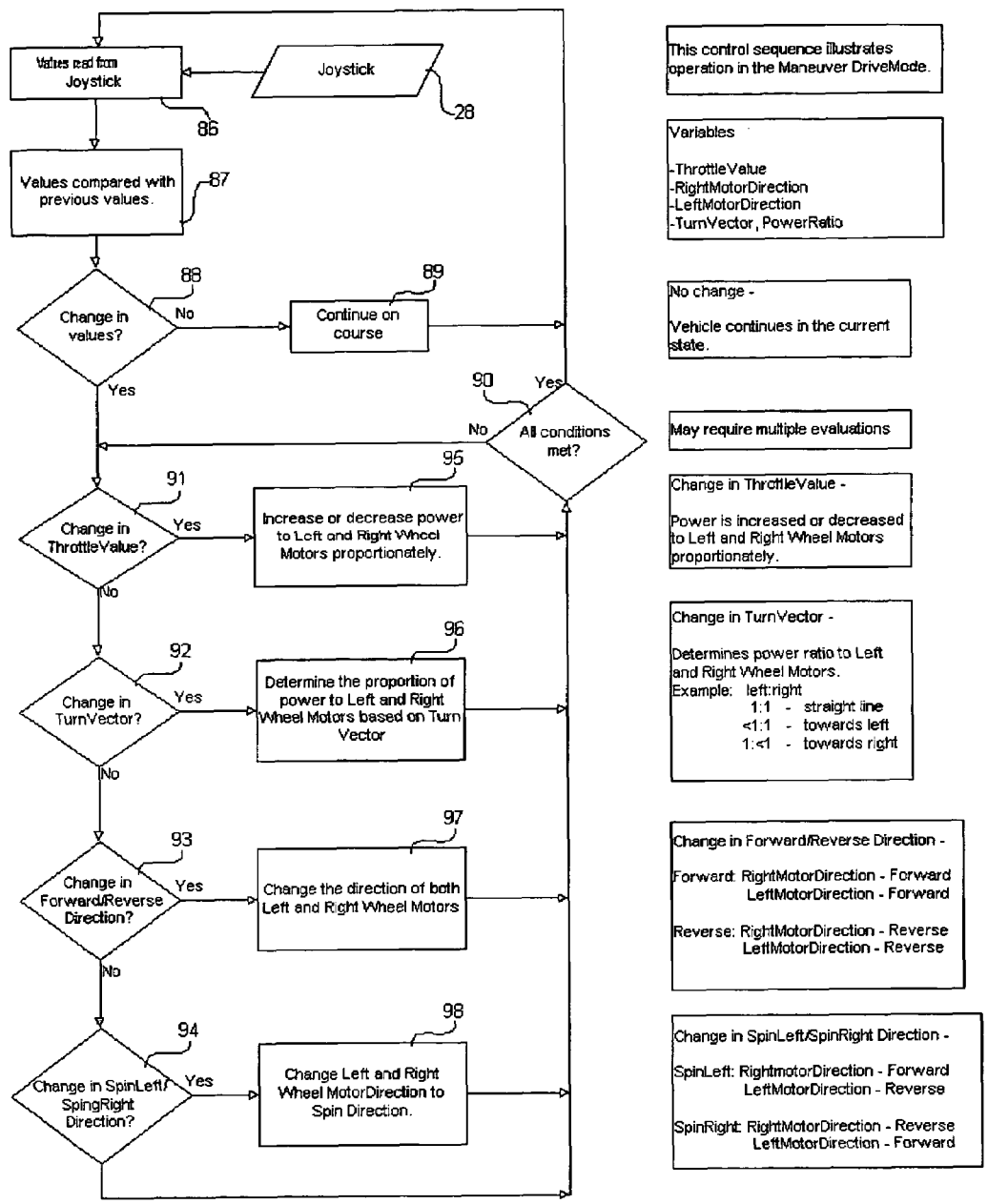
Figure 9: Internal control flow in operation

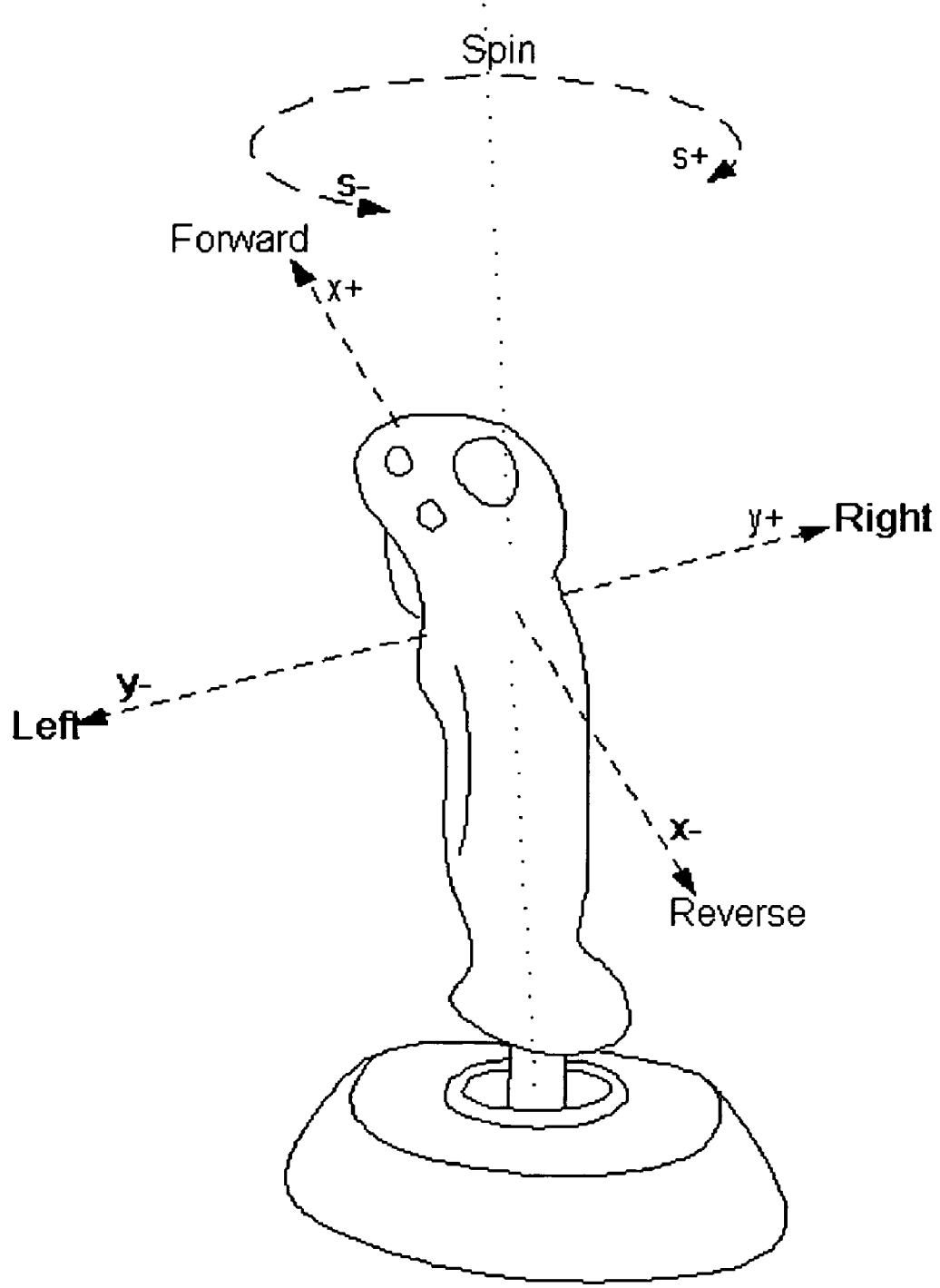
Figure 10 : Joystick motion control reference axes

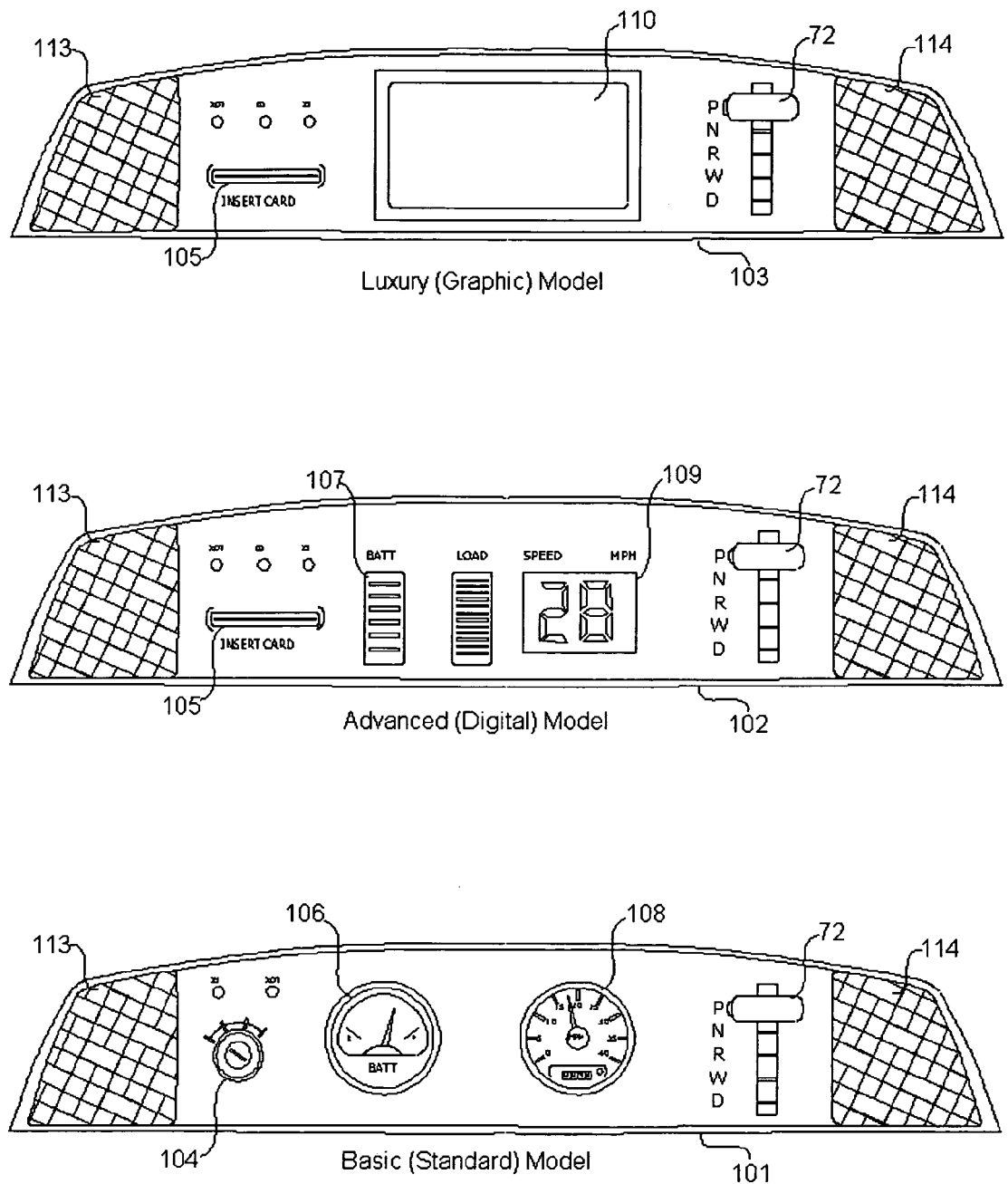
Figure 11 : Dashboard designs

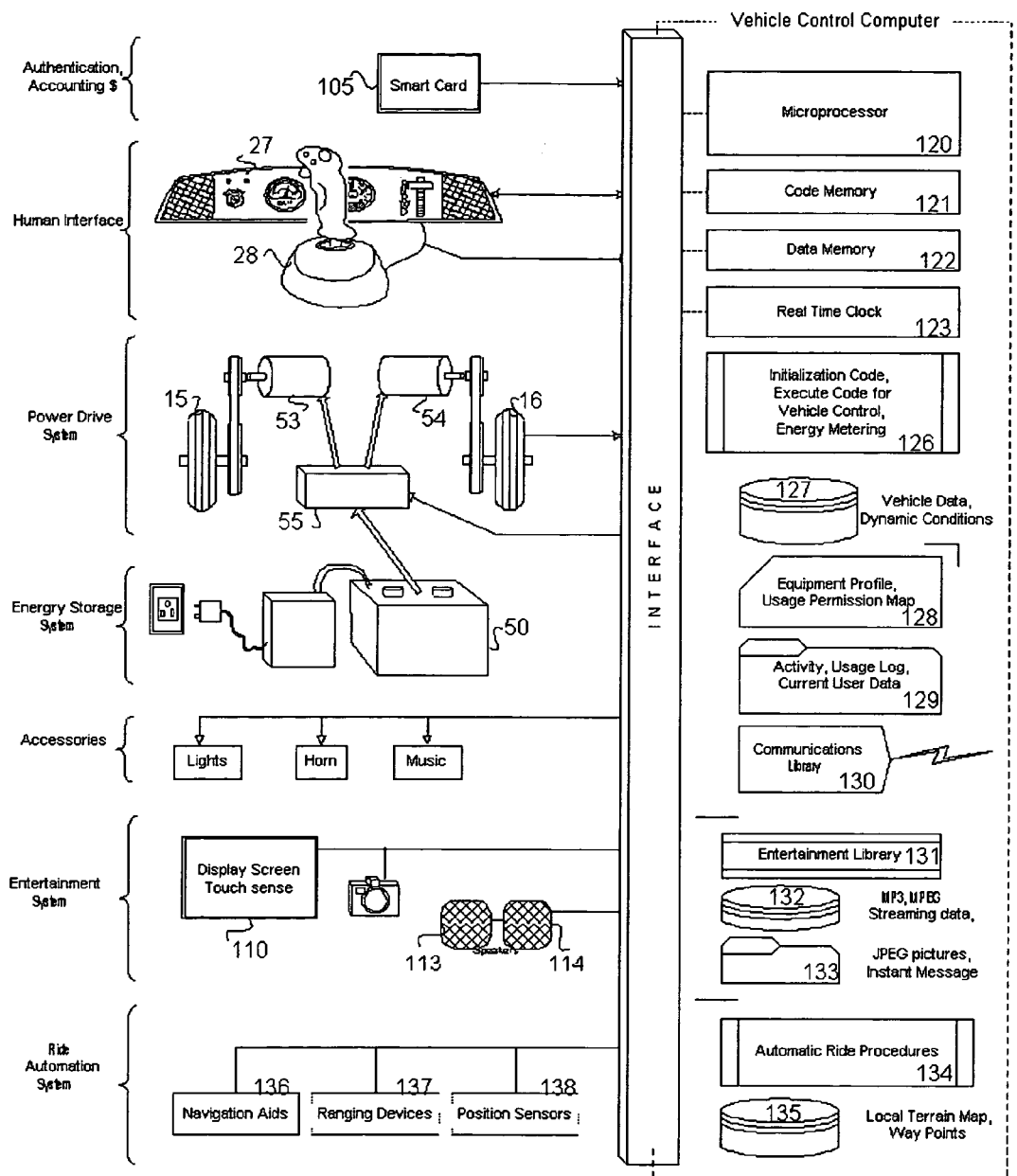
Figure 12 : Vehicle Control Computer

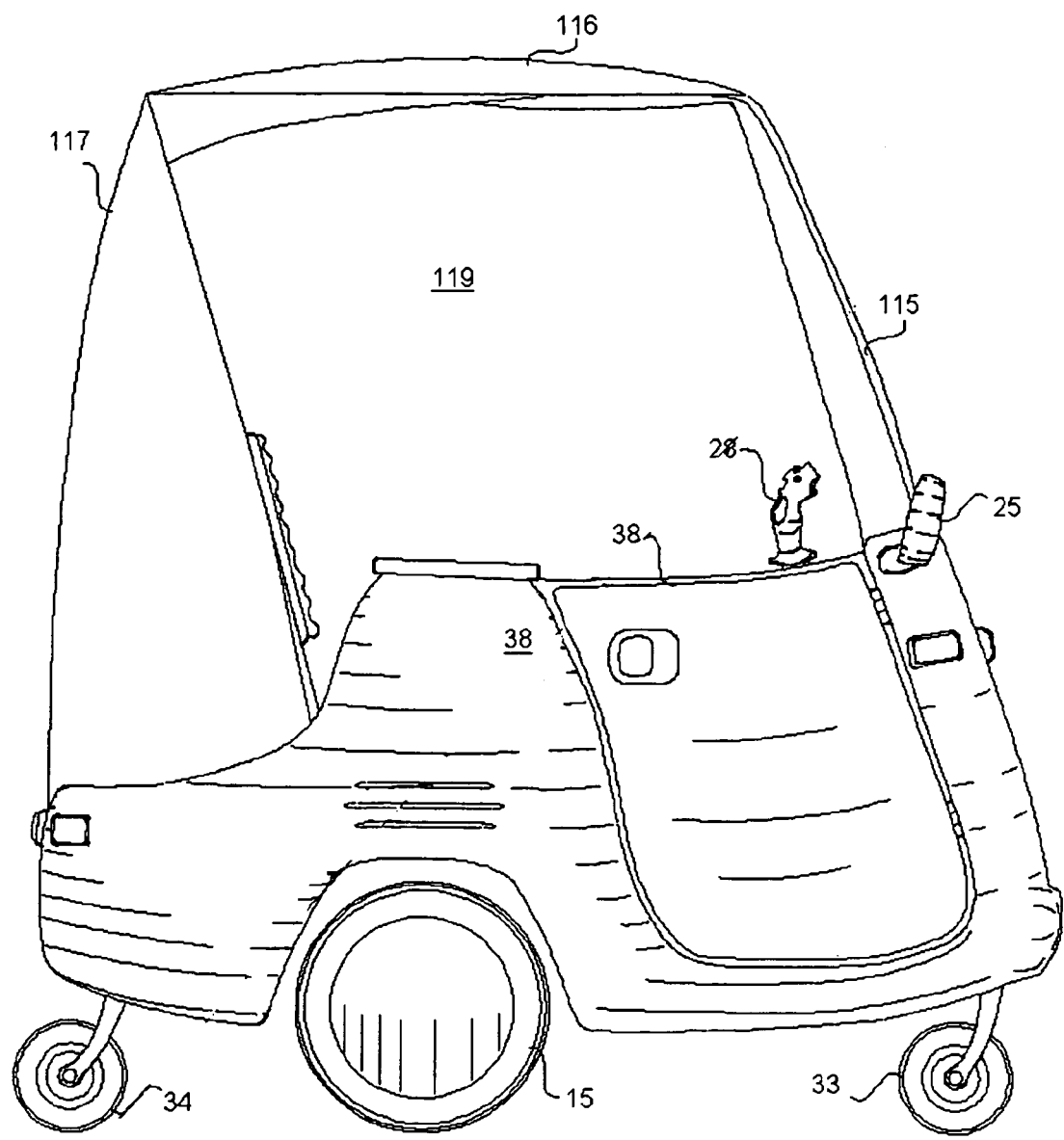
Figure 13 : Side View of an embodiment with hood.

RECREATIONAL ELECTRIC VEHICLE

RELATED APPLICATIONS

This application is a continuation-in-part of U.S. patent application Ser. No. 29/183,300, filed Jun. 9, 2003 now abandoned.

FIELD OF THE INVENTION

The invention relates to electric-powered vehicles for recreational use.

BACKGROUND

Small electric powered vehicles are fairly common in a variety of applications including golf carts, short-range delivery vehicles, campus and event transport. In each of these applications, the vehicle is a miniaturization of a standard four-wheeled road vehicle with a fairly standard provision of controlled electric motive power to vehicle wheels. In that such vehicles are steered conventionally by turning two wheels mounted at the front end of the vehicle, their maneuverability is not significantly better than that found in many road vehicles. Wheelchairs have innate high maneuverability but are limited to use by a single person with a physical disability. They are also unsuitable to carry luggage or packages. Furthermore, wheelchairs are generally structured as a chair, with wheels at the end of each of the "legs" of the chair.

DRAWING FIGURES

The present invention is illustrated by way of example, and not by way of limitation, in the figures of the accompanying drawings and in which like reference numerals refer to similar elements and in which:

FIG. 1 gives a perspective view of a recreational electric vehicle of one embodiment.

FIG. 2 shows a side view of the recreational electric vehicle of one embodiment.

FIG. 3 shows a plan view of the vehicle chassis with one embodiment of the location of the wheels.

FIG. 4 shows a schematic diagram of one embodiment of the drive system of the recreational electric vehicle.

FIG. 5 shows a schematic diagram of one embodiment of the electric power system.

FIG. 6 provides a schematic diagram that describes one embodiment of the control system transfer functions.

FIG. 7 shows one embodiment of a motion control system block diagram.

FIG. 8 shows one embodiment of a summary flowchart of the vehicle operation.

FIG. 9 shows a detail flowchart of one embodiment of the vehicle operation when driven.

FIG. 10 illustrates one embodiment of details of the joystick for the motion control of the vehicle.

FIG. 11 illustrates three exemplary models of the dashboard.

FIG. 12 describes one embodiment of the components of the vehicle control computer.

FIG. 13 shows a side view of an embodiment of the vehicle with a hood.

SUMMARY

The recreational electric vehicle (hereinafter REV) is a convenient indoor or outdoor vehicle for one or two people with a space for personal goods. REV is most suited for adaptations for recreational use. It uses electric power for zero pollutant emissions, quiet operation, and a very low running cost. REV is driven using a joystick and is able to turn on the spot.

DETAILED DESCRIPTION

Overview

A miniature electric vehicle accommodates one or two people, powered from a portable electric power, driven by a pair of wheels on either side, controlled by a joystick operations. Front and rear wheels provide stability, lending itself to be driven in any direction by the powered wheels. Applying equal amount of power to both wheels propels the vehicle in a straight line forward or in reverse. Applying an unequal amount of power to the wheels turns the vehicle towards the side with lower power. If an equal amount of power is provided to both wheels, but in the opposite direction, the vehicle can spin on the spot. The driver can steer the vehicle in several combination maneuvers described.

The wheel configuration geometry is a diamond shape, rather than rectangle that is found in most powered vehicles today. In one embodiment, the diamond shape is asymmetrical. In one embodiment, the back wheel is closer to the central axis defined by the side wheels.

This geometry enables a nearly circle shaped floor plan, further increasing the maneuverability, without hitting obstacles encountered on the corners in the case most traditional vehicle design. The structure and the geometry enable the use of a super-structure that provides an interesting appearance to mimic real objects, mascots, theme characters, or other shapes that may be used in theme parks and street parades.

A joystick provides the steering control. In one embodiment, equipment limitations under dynamic conditions are known to the computer, which is used to restrict the driver within safe limits. In one embodiment, when the driver is restricted a simultaneous vibrating alert on the joystick handle is provided.

Dashboard multimedia computer can provide hosts of audio and video entertainment, in addition to local event specific information or sharing the Internet by wireless networking.

Recreational electric vehicle has a high entertainment value while providing built-in safety, maintaining the environment with zero pollution, and running at a very low cost.

OBJECTS AND ADVANTAGES

The recreational electric vehicle, described in herein may have the following advantages:

- To provide a very compact recreational transport vehicle for one or two people.
- To run on electric power for zero pollutant emission and low running cost.
- To provide highest maneuverability including an ability to spin on the spot.
- To provide an inherently quiet ride, with option to provide multimedia based audio electronic means to enhance the ride experience.

To enable operation of the vehicle with an easy to use joystick, reducing the learning time on steering wheel and foot pedals.

To incorporate increased safety of the ride, by means of interfacing sensors for obstacle detection, collision detection, influencing the ride characteristics.

To allow predetermined programmed sequence to enrich ride effects (e.g.: spins and zigzags) and external means of controlling the vehicle for an automated ride or coordinated group rides.

Further objects and advantages are to provide by having a simple to use, easy to learn, and fun vehicle. Note that a subset of the above advantages may be implemented in any recreational vehicle.

Physical Structure and Controls

One embodiment of the present invention is illustrated in FIG. 1 (front perspective view) and FIG. 2 (side view). In one embodiment, the plan wheel geometry of the REV is substantially a diamond form shown in FIG. 3.

In one embodiment, the REV has two transversely mounted, spring-suspended drive wheels 15, 16 that are mounted near its longitudinal center to bear most of the vehicle's weight. Two longitudinally separated wheels 33, 34 are mounted near the front and rear of the REV respectively to stabilize it. The arrangement with each of the front 33 and rear 34 wheels on the vehicle centerline enables the design to be made without prominent corners, contrasting with the case of a traditionally designed four-wheeled vehicle whose geometry results in corners which are often accident prone. The REV features a rounded shape, which enables negotiating tight spaces, reducing the possibility of collision damage to its corners. The REV includes a body 38 optionally composed of sheet metal, fiberglass, or thermoplastic panels mounted over a rigid frame 30 (shown in FIG. 3). In one embodiment, the body is made of a lightweight, rigid material. In another embodiment, not shown, the body panels may have fanciful shapes, for entertainment purposes.

In one embodiment, a seating platform 11 and backrest 12 is provided for one or more riders of the vehicle. In one embodiment, the seating platform 11 and backrest 12 may be padded, or may form a "bucket seat" or "love seat" for comfort. In one embodiment, armrests, left 13 and right 14 are provided for the comfort of the rider. A center armrest may be available in one embodiment, for two-person vehicles. The center armrest may be fixed, or may be moveable, to allow a single rider to sit in the center. In one embodiment, storage pockets are provided on the inside of each side panel below the armrests, below the seat and below the dashboard.

The REV is driven by two transversely mounted drive wheel assemblies, 15, 16, as shown. This drive-wheel assembly includes a wheel with a tire, mounted on left axle 17, right axle 18. Front wheel 33 and rear wheel 34 (shown in FIG. 2) are provided for pitch stability. In one embodiment, the front, and rear wheels 33, 34 are castor wheels, or similar free-running wheels that are not powered, or driven.

FIG. 1 shows a front panel 19, made of reinforced material for impact resistance, designed to protect the internal electrical and dashboard electronic systems. The front panel 19 is designed both for utility and pleasing appearance. In one embodiment, the front panel 19 carries a left main light 21 and a right main light 22, and yellow turn signal lights 23 and 24. In one embodiment, the main lights 21, 22 can be switched to high beam or normal beam settings; and can also function as running lights. Also mounted in the front panel 19, behind grille 20, is a speaker, which serves the function of a vehicle horn and which can provide amplified sounds that include spoken words or simulated engine sound effects. In one embodiment, it can also function as a megaphone by directing the operator's amplified voice. In one embodiment, the rear-view mirrors 25 and 26 are adjustable. The dashboard 27 is explained with its functions in detail with respect to FIG. 11.

Operator control of the vehicle's movement is accomplished by means of a joystick 28 positioned in front of the operator. The functioning of the joystick 28 is described in more detail below.

FIG. 2 shows one embodiment of a side view of the REV. At the rear of the REV are provided a set of lamps on the right side and left side. In one embodiment, there is a set of lamps for: brake, (red), reversing (white), turn (red), and running (red). In one embodiment, the REV includes a luggage space 36 is at the rear of the occupant's space 35. In one embodiment, the battery stack is found between the wheels below the seat 11. The joystick 28, positioned in front of the operator, provides for operator control in a specific manner selected by a drive mode selector 72 mounted on the dashboard 113 of the REV. In one embodiment, the joystick is mounted movably, to permit adjustment to the length of the user's arm.

The chassis design lends itself to a range of size and shapes of the exterior body design, can be easily adapted to include body shapes suitable for floats in street parades, and mobile objects for advertisements, mascots and characters found in theme parks.

The basic design characteristics are highly scalable. Using larger motors and larger chassis the physical size of the REV can be constructed to a much larger scale as desired, while the functional characteristics are essentially retained. Likewise the REV can be scaled down to a size of a child's riding toy vehicle with reduced speed and capabilities.

FIG. 3 shows a plan view of the REV chassis built on a rigid frame 30. The chassis holds the seat, 11, side panels 38, 39, front panel 19 and rear panel 29. The chassis frame also mounts the left and right drive wheel assemblies 15 and 16 respectively, each provided with a spring suspension frame 31 and 32, respectively. The spring suspension provides for rider comfort. In one embodiment, a single long axle mounts the drive wheels 15 and 16 for simpler suspension and mounting arrangement with the chassis frame.

The drive wheel assemblies are positioned one on each side the frame such that the wheels have a substantially common axis of rotation. An imaginary line joining their axle shafts 17 and 18 is substantially longitudinally aligned with a vertical line through the center of gravity of the REV such that the drive wheels bear most of the weight of vehicle and payload. Longitudinally separated front wheel 33 and rear wheel 34 are each mounted near the front and rear of the REV, respectively. In one embodiment, these wheels are not driven but maintain contact with the ground and stabilize the REV. In one embodiment, the front and rear wheels 33, 34 are supported using a suspension arrangement.

In this plan view, rider's area 35 and cargo area 36 is indicated. Battery packs 50, 69 are located approximately in the region 37. In one embodiment, the battery stack 50 can be Lead-acid, Ni—Cad, Li—MH, or another chemistry. By including a fuel cell power pack the REV can provide a menu of choices for weight, range, recharge characteristics, and cost. In one embodiment, a separate power pack 69 is used for control circuitry, lights, and accessories. In one embodiment, the battery stacks 50, 69 use a quick-replace arrangement to enable quick replacement of a discharged battery pack with a charged battery pack in seconds. In one embodiment, a battery charger is built into the REV, so to charge the plug simply needs to be plugged into an AC outlet. In one embodiment, the battery charger plug is on a retractable power cord, such that it does not extend from the vehicle when not in use.

FIG. 4 shows a schematic representation of the principal functional assemblies of the REV in one embodiment. To obtain the desired speed and torque, the motor operating range is geared down to the vehicle operating rage of speed. In one embodiment, left drive wheel assembly 15 is driven by a left-hand-side transmission assembly 41 consists of driven sprocket 43, (attached to axle shaft 17), a driving sprocket 45, (attached to left motor shaft 47), and a drive chain 51 linking the two. There are corresponding parts on the right side drive wheel assembly 16 and the right-hand-side transmission assembly 42 is 44 (18), 46 (48), and 52. Current from battery stack 50 drives the Left Motor 53 and right motor 54, with individual power control (for left and right motor) by power control module 55. Wiring harness 57 and 58 connect left and right power control modules to their corresponding motors. Wiring harness 56 carries battery current to motor power control module 55. In one embodiment, the metering circuits 68, 70 for the battery charge level and discharge rate are performed at this point. The motor power control module 55 is managed by vehicle control computer 60, which works in accordance with driver's commands received from joystick 28, and drive mode selector 72 in the dashboard 27, which are connected by cable 59.

The joystick 28 provides for control of the REV with implementation of the motive functions: forward motion, left and right turn, right and left spin, and stop. More details of the joystick are discussed in the description relating to FIG. 10. Motion control relation with respect to Joystick in a selected mode is found in FIG. 6. In one embodiment, the joystick also provides controls for audible horn or siren, indicator functions: turn signal, backup signal, and provides controls for operating the headlights. The drive mode selector 72 in one embodiment resembles drive shift lever in a car. The drive mode selector 72 is used to select between the modes: park, neutral, reverse, weave, and drive forward. The REV is maneuvered by means of applying accurately controlled power to each drive wheel, which may be driven in either direction. When the wheels are driven with equal speed in the same direction, the REV moves in a straight-line motion, in forward or reverse as selected. When the wheels are driven with a differential speed, the REV turns towards the slower side, at the rate dictated by the difference in power applied to the wheels. When the wheels are driven with equal speed in the opposite directions, the REV spins about its vertical axis. Joystick 28 provides (from the driver) input signals to drive a desired motion, which may combine forward/reverse, turn left/right, spin left/right in varying amounts. The vehicle control computer 60 computes the speed for left and right wheels 15, 16 and sends the command signal to the motor power controller 55. The motor power controller 55 ensures accurate control over the wheel speed, for the desired motion.

In one embodiment this control is accomplished by providing each drive wheel with a separately controllable electric motor and drive transmission. This transmission may comprise gears, pulley and belt systems, sprockets and chains, or any other combination that enables transfer of torque from the motor to the drive wheels. In one embodiment, the power transfer uses a fixed gear ratio. In another embodiment, a transmission may incorporate provision for varying the gear ratio between each motor and its respective wheel so as to provide optimal torque at a speed.

FIG. 5 is a schematic diagram of one embodiment of the electric power system with the current paths that it contains. The battery 50 supplies current to left motor 53 and right motor 54 to provide the motive power for the vehicle through the motor power controller 55. The motor power controller 55 incorporates DC-to-DC power converters that may employ pulse-width modulation or another mode of power control with adjustable gain parameters for proportional, integral, derivative controls.

The current transferred through this motor power controller 55 to each motor (through path 57 to the left motor and path 58 to the right motor) is controlled by the digital vehicle control computer 60, which commands motor power according to joystick input, applying its control parameters. In addition to the main battery 50, the auxiliary battery 69 supplies power via path 61 for vehicle control computer, dashboard accessories, running lights, signal lights, audio system and other circuits.

In FIG. 5, path 62 represents the current discharge path from the main battery 50. The battery 50 is charged through the path represented by 63, which carries charging current from one or more of the available current sources. In one embodiment, the current sources include: domestic power (AC) line outlet 64, solar panel 65, or cable 66 for connection to another vehicle, for example a service vehicle. This charge path may also receive current derived from regenerative braking action from both motor, shown by path 67. Metering block 70 measures current and voltages through circuit block 68, on charge and discharge circuits. These measurements are used by the REV vehicle control computer to make optimized control decisions and to provide visual indication on the REV dashboard for operator information.

FIG. 6 shows the representation of one embodiment of the joystick input to the motor power output and the control relationship that is achieved in various drive modes selected. The vehicle control computer runs a software control program that establishes the input-process-output relationship in the context of real time control of the vehicle's motion control.

The selected drive mode from the dashboard 27 determines the algorithm, process, operating range, and safety limits. Joystick 28 provides x, y, s signals, corresponding to throttle, turn vector, and spin vector. The table in FIG. 6 lists exemplary x, y, s values, and the drive mode as inputs to the vehicle control computer. From the control computer 60, the output signal is sent to the motor power controller 55, which drives the motors 53, 54 and eventually wheels 15, 16. Exemplary output sent to the left and right motors 53, 54 are also listed in the table, with left motor direction, right motor direction, and relative ratio between their speeds. For example 1:1 ratio and both motors in the forward direction represents a straight line forward motion, the actual speed depending on the throttle value.

FIG. 7 shows a block diagram of one embodiment of the vehicle control system. The vehicle control system provides the correct amount of power (and the correct polarity) to the individual wheel motors to affect the desired motion. Drive mode select switch 72 may be set in modes: park, neutral, reverse, weave, and drive forward. After a drive mode is selected, the operator pushes the joystick 28 in a desired direction, by a certain amount. The joystick input is conditioned by its interface 71. Command receptor 73 receives signal inputs from the drive mode selector 72 and joystick interface 71 or from an external signaling interface 74. The external signaling interface 74 interacts with its connector 75 enable external systems to provide navigation guidance. For example, the external systems may include a GPS-receiver based controller, a towing controller, a remote controller, or other forms of controls.

These inputs are received as a continuous stream of control data. The control data is essentially the motion directives. In on embodiment, the motion directives are influenced and modified by the particular user profile and equipment profile, represented by block 76, and the modified control data is passed to the motion vector generator 77. The user profile and equipment profile block takes account of settings such as type of user permissions and equipment capabilities to determine and influence or override driving characteristics, optimizing battery energy, towing permissions, and several other features. For example, a child may have an activation key that indicates that he or she is limited to driving at 5 miles per hour. Thus, regardless of how hard the joystick is pushed forward, the user profile limits the maximum speed of the REV. Other motion characteristics, such as maximum acceleration, maximum range, etc. may also be limited.

The motion vector generator 77 processes the command signals received in real time from the command receptor block 73, taking account of input from safety sensors represented by block 78. Such sensor inputs, in one embodiment, include, among others, anti-roll and motor temperature sensors. Collision sensors can be used for "smart" collision avoidance by sensing position and dynamic target vector so as to be able to compute collision likely profiles and prevent or minimize their effect. The motion vector generator block 77 generates a real-time motion vector that is referred to the center of the vehicle. This motion vector is continually output as drive command signal, which is translated by the control coordinator 79 into separate drive signals (intended for the left and right motors 53, 54) to the motor power controller 55. These drive signals cause the motors to be powered in a coordinated fashion and in such proportion to realize the motion vector.

In one embodiment, the control coordinator block 79 also receives returned angular velocity, or position encoder 111, 112 feedback from the wheels. This feedback mechanism is used to enhance the precision of control and provide functions such as anti-lock braking. It may be also used in a determination of lost wheel traction and in case of variable transmissions provide the feedback for optimizing gear ratio dynamically. In FIG. 7, the blocks represented 71, 73, 74, 77, 79 are logical blocks that are part of the vehicle control computer 60.

Operation

The manner of using the REV is very similar to driving a car, except that the driver uses a joystick, instead of using a steering wheel, throttle, and brake. For people who are familiar with video games using joystick, this is a reality.

In one embodiment, to drive the REV, operator chooses appropriate drive mode selection on drive mode selector 72 and works on the joystick 28 positioned in front of the operator. The drive mode selector 72 is used to select between the modes: park, neutral, reverse, weave, and drive forward. Park uses a mechanical wheel brake to ensure that the REV does not move. Neutral disengages the motor from the wheels and releases the parking brakes. Drive forward is used the most, to drive in the forward direction, with turns when needed. Reverse operates in a similar fashion in the reverse direction, with a reduced speed for safety. Weave is a combinational mode useful in restricted indoor spaces for forward, reverse, spin motions simultaneously, but for a very restricted speed of operation. In weave mode, the joystick controls are altered to provide forward and reverse movement, without changing the drive mode.

Joystick provides for control of the REV with implementation of the motive functions: straight-ahead motion, left and right turn, reverse motion, right and left spin on the spot, some combination motions, and brake operation. In one embodiment, a mechanical brake is provided for emergency stop and parking operation. In one embodiment, an engine brake may further be provided.

In one embodiment, the joystick also provides controls for turn indicator, backup signal, headlights, and horn. In one embodiment, the onboard multimedia computer may be employed for a variety of amusing effects, sounds for horn function and selectable engine noise like jet engine, steam engine, racing car, motor bikes, etc. that track the throttle.

FIG. 8 outlines one embodiment of the operational sequence that an operator would encounter. The driver after he or she is seated inserts the authentication card or key. Dashboard lights up showing appropriate meter readings and indications. The driver shifts the drive mode selector from "park" to "drive forward" position. The driver now gently engages the joystick to move forward. The vehicle starts moving, accelerating, until the desired speed (directed by joystick) is reached, and continues to track the joystick input in real time. In one embodiment, the acceleration is limited by the user's profile. Thus, even if the user roughly pushes the joystick forward, the acceleration will be at a safe pace.

A slight move to left or right on the joystick makes the REV to turn in the desired direction, by the desired amount. When the destination is reached, the driver slows down, pulls back the joystick (to brake the vehicle), releases the joystick (which returns to a neutral position), shifts the drive mode selector to "Park", removes the key, and leaves the vehicle. Other drive modes like wise work in conjunction with the joystick, which are essentially variations in similar controls.

The sequence start 81 begins when the key is inserted. An initialize sequence 82 obtains a set of values, determined based on the user profile information on the card and from the equipment profile information on the vehicle control computer. Following initialization 82, control is passed to the vehicle control program 83, which is detailed in the flowchart of FIG. 9. This program controls the vehicle in response to operator input until the key is removed, at which time a power down sequence 84 is entered. On completion, the program sequence ends 85.

FIG. 9 shows the detailed vehicle operational control sequence with drivers input from joystick. The "weave mode" is chosen here for discussion here, since it has full freedom of motion, and program execution sequence transits through all blocks. Joystick 28 provides the current reading of x, y, s parameters, to the logic block 86. The signed numeric values of these parameters correspond to throttle value, turn vector and spin vector.

When the vehicle is driven at a constant speed, and there is no change in any of the parameters 88, the vehicles continues on its current course 89.

A logic block 87 compares the current values of x, y, and s with the previous values to detect a difference in throttle value 91, turn vector 92, forward/reverse direction 93, spin left/right direction 94. Suitable action is performed in blocks 95, 96, 97, 98 corresponding to decisions made at 91, 92, 93, and 94. Block 90 makes sure all conditions are met to complete the change of course observed from the joystick. Due to vehicle dynamics, it may take a short while to complete the action, for example to execute a turn it takes a second or two, during which time the control loop is steered by logic block 90 through the current action, until complete. The control loop continues to keep the code execution stay on current course 89. If the hand is released from the joystick, it returns to a neutral position, resulting in a zero motion.

FIG. 10 shows a representation of the joystick control. In one embodiment, the joystick is mounted on a mechanical arrangement that adjusts for comfortable operator manipulation while positioned on any part of the seat. For example, the operator could be seated on the left or right side and operator and passenger roles might be switched easily without either one having to change seats. In one embodiment, the joystick is spring loaded with a neutral center position at which the vehicle is brought to a complete stop. The joystick returns to this neutral center position when the operator's hand is removed.

In one embodiment, the Joystick handle can be moved over a complete 360 degrees. Forward joystick movement activates forward motion; reverse motion is activated by reverse movement of the joystick in weave mode, while forward joystick movement actives forward motion, and reverse joystick movement brakes the car in forward mode. These movements are augmented with slight turns, if the joystick handle is moved sideways. The joystick can also be twisted clockwise or anticlockwise by about 90 degrees. This movement is used to accelerate a turn, or it is used to initiate a spin about the REV's vertical axis. In one embodiment, if the joystick has a vibrating motor in it, can provide the operator with tactile cues from the equipment to alert of an impending situation, for example, the driver operates beyond safe range. This simple feedback reminder adds to the safety of operating the REV.

The joystick has a trigger button that can be operated by the forefinger to activate the vehicle horn. In one embodiment, a multimedia-enabled talking horn can be activated. In one embodiment, there is also a hat switch, which is used to activate the turn signals, headlights, and rear lights. Other programmable switches on the handle and on the base of the joystick may be used for a variety of functions. In another embodiment, these switches or controls may be located on the dashboard, and not be a part of the joystick.

In another embodiment, speech input is processed and used as the primary control of the vehicle. In this case, the input from the joystick is substituted with external control interface 74, 75, (FIG. 7) sending control codes that are interpreted from the voice commands. This implementation may be made to use speaker independent form of speech recognition or a speaker dependant form. In the speaker dependent form, speech processing is selected only to react to the voice of a particular person, recognized by the personalized smart card. This embodiment may benefit handicapped people or provide yet another comfortable interface to interactive fun seekers.

FIG. 11 shows three embodiments of dashboard design 27, a basic design 101 with analog meters, an advanced design 102 with digital displays, and a luxury design 103 that has a graphic display unit and employs a multi-media computer. Essential functional features are the same across these embodiments but their implementation may differ. The principal elements on the dashboard are the authorizing key, instrumentation display, drive mode selector, accessories, and entertainment consoles.

The authorizing key 104, 105 ensures the driver has rightful ownership of the vehicle. In the basic design, in one embodiment, the authorizing key 104 resembles a standard vehicle ignition key and it has four positions: off, accessories power, vehicle motive systems enabled, and finally, external motion control. In the Advanced and luxury models, the authentication key takes the form of a smart card, which can be inserted into the smart card reader 105. The smart card carries the user's authority and can enable a greater range of functions to be programmed. One of the key benefits of the smart card is that it enables usage based billing directly based on smart card. The user uses this feature in a way similar to calling cards, where the money is paid at first, for a predefined amount of usage.

Indicator lamps are provided to indicate vehicle status (color-coded) of electrical system and energy system. Analog meter 106 displays battery charge level, by digital bar graph indicator 107, and in the LCD panel display 110, for the basic, advanced, and luxury models, respectively. Indicators 108 and 109 display speed.

In the luxury model, the graphics panel display 110, in one embodiment a touch screen using liquid crystal display (LCD), is attached to a multimedia enabled dashboard computer, which generates graphical images in color. These are multi purpose displays with touch screen that provide interactive responses. One such choices display the vehicle status. In other choices of display, several capabilities for multimedia entertainment, voice and text based instant communications other interesting options are provided. Left and right speakers 113 and 114 are provided, for audio prompts (talking vehicle), and multimedia entertainment.

Drive mode selector 72, explained earlier, is found in the three embodiments of the dashboard described here. It selects between the drive modes: park, neutral, reverse, weave, and drive forward.

FIG. 12 describes one embodiment of the components of the vehicle control computer and its interfaces to the various parts of the REV. The microprocessor 120, code memory 121, data memory 122, the real time clock 124 and the interfaces 125 are the physical components of the vehicle control computer. The microprocessor 120 executes the read-only codes from the code memory 121, in a sequential manner. During the program code execution, the data memory 122 is used to store results of the computation and referred later when necessary. The real time clock 124 maintains an accurate timing mechanism and keeps the real time code execution in sync.

There are several types of physical interfaces 125 represented that connect the devices to the vehicle control computer. Interfaces to dashboard electronics, motor power controller, battery charging circuits, accessories like lights, horn are some of the interfaces that are used.

The software organization of code segments and data segments establish a logical relationship for a functional aspect involved in vehicle control computer. These are grouped under the respective symbol representing its function. Procedural logic block 126 is the procedural section, which is executed, in one embodiment, after the initialize sequence. In one embodiment, permissions logic block 128 represents a card file that has the equipment profile and usage permission map. This information is consulted to determine the ride characteristics for a specific class of users. Characteristics logic block 127 is a database that contains the vehicle specific data that may determine the dynamic characteristics of the vehicle during the ride. Log logic block 129 is a file containing the activity log and overall usage log, along with the current user data. In one embodiment, the logs can be read out into a fleet management system.

The communications library 130 may also be available to the REV. In one embodiment, the communication library 130 includes wireless protocol that is used in the deployment of wirelessly connected REVs. In one embodiment, the motion control interface uses text-based messages that resemble XML-like simple syntax, with advanced vocabulary. The set of predefined message strings makes it easy to integrate in larger scheme of automation and intelligence. The communication interface is extended to a wider coverage using RF modems, and notably wireless Wi-Fi networking.

Entertainment logic block 131 contains entertainment libraries that include locally stored collection and a huge amount of data accessible over the wireless LAN. Contents like MP3 music clips and MPEG streaming video are supported. Personalized files may provide room for additional JPEG photo picture clips, Instant message sessions. The REV can have special programmed sequence movement for fun ride.

In one embodiment, the REV incorporates an ability to execute macros or subroutines. The vehicle control computer can be used for (memorizing and instructing) performing certain routine maneuvers when the sequence is desired. In one embodiment of the REV, some relevant macros may be incorporated. For example: high speed spin n times for a dizzy effect on the rider, rock (shake) and roll, while REV moves on a course, loose wobbly motion like a drunken walk while REV stays on course, pirouette walk, slow 360 spin while maintaining straight course.

In one embodiment, the REV provides built-in mechanisms for creating automated rides. Automation logic block 134 handles such procedures related to automatic rides. Such an automated ride would use information on local terrain maps and waypoint details provided in location recognition logic block 135. In order to effectively execute the automated ride, additional equipments to provide navigation aids 136, ranging devices 137 and position sensors 138 may be used. These details vary with specific technology to be deployed and the complementary sensor system to provide safe, and fun filled rides.

OTHER EMBODIMENTS

FIG. 13 describes another embodiment, to include a hooded design for the REV. This vehicle is described in the generic design disclosure as having an open form, with seats, drive control and dash board. A design that incorporates a body to cover the sides and the top is useful in certain applications, for example, those where the windshield and the roof provide the user protection from cold, windy, wet weather conditions as well as intense sunlight. The design incorporates a solid windshield 115, soft roof 116, and rear windshield 117, with necessary support structures. This design can optionally be provided with door 118 and window 119. On the roof, adequate surface area is available for incorporating a suitable solar charger.

CONCLUSION, RAMIFICATIONS, AND SCOPE

Accordingly the reader will see that the simplicity and versatility of this invention can be used in recreational electric vehicle, and the additional embodiments described earlier. In addition, the capabilities of the REV can be re-designed without substantially altering the basic invention. This refers to the battery life, power of the motors, and choice of transmissions, variations in seating and accessories and options for the entertainment purposes.

Although the description above contains much specificity, these should not be construed as limiting the scope of the invention but as merely providing illustrations of some of the presently preferred embodiments of this invention. For example while a typical joystick interface is described, another type of steering mechanism, such as a game pad or yoke, may be used to control the vehicle. Similarly, while the wheels shown appear of uneven size, wheels of identical size may be used at all four locations. Thus the scope of the invention should be determined by the appended claims and their legal equivalents, rather than by the examples given.

I claim:

1. A recreational vehicle (REV) comprising:
a frame having a longitudinal axis and a lateral axis, the lateral axis intersecting the longitudinal axis at a center of gravity of the REV;
first and second drive wheels attached to the frame along the lateral axis;
third and fourth wheels attached to the frame along the longitudinal axis, the wheels arranged in a diamond shape;
a first motor and a second motor, connected to the first and second drive wheels respectively, the first motor and the second motor able to be engaged in the same and in opposite directions; and
a joystick to control the first and second drive wheels, the joystick configured to respond to a twisting motion by causing the REV to spin about its axis.

2. The REV of claim 1, further comprising: a battery to provide power to the first motor and the second motor.

3. The REV of claim 2, further comprising: a second battery to provide power to signals, displays, and entertainment electronics within the REV.

4. The REV of claim 1, further comprising: a joystick to control the REV.

5. The REV of claim 4, wherein the joystick is further for operator selection of vehicle speed, vehicle turn radius and vehicle turn angular velocity, whereby the REV may move in a straight line, in a turn, or spin in place.

6. The REV of claim 5, wherein the joystick is further to control braking.

7. The REV of claim 4, further comprising: a drive mode selector to select a drive mode, the drive modes including forward and reverse.

8. The REV of claim 7, wherein the drive modes further include Park, the Park mode comprising applying an engine brake to ensure that the REV remains stationary.

9. The REV of claim 4, further comprising: a moveable mount for the joystick, the moveable mount enabling the joystick to be positioned properly for drivers of various size and at various seating locations.

10. The REV of claim 1, further comprising: a dashboard including a joystick and a drive mode selector.

11. The REV of claim 1, further comprising: a smart card reader to receive a smart card, the smart card to act as an activating key to make the REV functional.

12. The REV of claim 11, wherein the smart card stores a user profile, the user profile specifying abilities of the REV.

13. The REV of claim 12, wherein the user profile may comprise one or more of the following: a maximum range, a maximum speed, a maximum acceleration, a maximum weight limit.

14. The REV of claim 1, further comprising: a vehicle control computer to enable various functions of the REV.

15. The REV of claim 14, wherein the vehicle control computer comprises: an equipment profile to limit the REV functionality depending on a current condition of the REV.

16. The REV of claim 14, wherein the vehicle control computer further comprises: automatic ride procedures to enable the REV to ride in a self-guided mode, without requiring user input through the joystick.

17. A recreational vehicle comprising:
a chassis frame;
first and second drive wheels attached to the frame, each of the drive wheels being capable of powered in being a clockwise or anticlockwise direction;
first and second stability wheels attached to the frame to provide stability to the frame, the first and second drive wheels and the first and second stability wheels together forming a diamond shape;
a drive motor for independently controlling a torque vector of each of the drive wheels, the drive motor able to power the drive wheels in the same and in opposite directions, enabling forward motion, turns, and spinning in place;
a battery to power the drive motor; and
a drive control system capable of taking a set of command signal inputs and applying transfer functions to them to produce the motion and braking function applied to each of the drive wheels;
a joystick to control the drive wheels, the joystick configured to respond to a twisting motion by causing the REV to spin in place.

18. The recreational vehicle of claim 17, wherein the set of command signal inputs are received from a joystick controller.

19. A recreational vehicle (REV) comprising:
a frame having a longitudinal axis and a lateral axis, the lateral axis intersecting the longitudinal axis at a center of gravity of the REV;
first and second drive wheels attached to the frame along the lateral axis;
third and fourth wheels attached to the frame along the longitudinal axis, the wheels arranged in a diamond shape;
a first motor and a second motor, connected to the first and second drive wheels respectively, the first motor and the second motor able to be engaged in the same and opposite directions;
a joystick to control the first and second drive wheels, the joystick configured to respond to a twisting motion by causing the REV to spin about its axis;
an electronic control system including:
a smartcard reader to receive a smartcard from a user, the smartcard enabling usage-based billing.

20. The recreational vehicle of claim 19, further comprising a substantially rigid body coupled with the frame and configured to protect the vehicle and a rider.

* * * * *

UNITED STATES PATENT AND TRADEMARK OFFICE
CERTIFICATE OF CORRECTION

PATENT NO.         : 7,243,746 B1                                      Page 1 of 1
APPLICATION NO.    : 10/714113
DATED              : July 17, 2007
INVENTOR(S)        : Abraham Vasant It is certified that error appears in the above-identified patent and that said Letters Patent is hereby corrected as shown below:

Column 5, line 11
    "rage of speed"---should read --range of speed--

Column 7, line 8
    "In on embodiment,"---should read --In one embodiment,--

Column 9, line 23
    "movement actives forward motion,"---should read --movement activates forward motion,--

Signed and Sealed this

Twenty-third Day of October, 2007

JON W. DUDAS
*Director of the United States Patent and Trademark Office*